April 23, 1963 W. C. BELK 3,086,455

FRUIT PROCESSING APPARATUS

Filed Nov. 17, 1958 8 Sheets-Sheet 1

INVENTOR
WILBER C. BELK

BY Hans G. Hoffmeister
ATTORNEY

April 23, 1963 W. C. BELK 3,086,455

FRUIT PROCESSING APPARATUS

Filed Nov. 17, 1958 8 Sheets-Sheet 2

INVENTOR
WILBER C. BELK

BY Hans G. Hoffmeister

ATTORNEY

April 23, 1963 W. C. BELK 3,086,455

FRUIT PROCESSING APPARATUS

Filed Nov. 17, 1958 8 Sheets-Sheet 3

INVENTOR
WILBER C. BELK

BY Hans G. Hoffmeister

ATTORNEY

INVENTOR
WILBER C. BELK
BY Hans G. Hoffmeister
ATTORNEY

April 23, 1963 W. C. BELK 3,086,455

FRUIT PROCESSING APPARATUS

Filed Nov. 17, 1958 8 Sheets-Sheet 5

INVENTOR
WILBER C. BELK

BY Hans G. Hoffmeister

ATTORNEY

INVENTOR
WILBER C. BELK

BY Hans G. Hoffmeister

ATTORNEY

April 23, 1963 W. C. BELK 3,086,455

FRUIT PROCESSING APPARATUS

Filed Nov. 17, 1958 8 Sheets-Sheet 7

INVENTOR
WILBER C. BELK

BY Hans G. Hoffmeister

ATTORNEY

INVENTOR
WILBER C. BELK

BY Hans G. Hoffmeister
ATTORNEY

United States Patent Office 3,086,455
Patented Apr. 23, 1963

3,086,455

FRUIT PROCESSING APPARATUS

Wilber C. Belk, Lakeland, Fla., assignor to FMC Corporation, a corporation of Delaware Filed Nov. 17, 1958, Ser. No. 774,459
4 Claims. (Cl. 100—131)

The present invention appertains generally to fruit processing apparatus and more particularly to juice extractors of the type adapted to handle whole fruit.

An object of the present invention is to provide an improved citrus juice extractor.

Another object of the invention is to provide an improved fruit feeder for supplying whole fruit to a fruit processing apparatus.

Another object is to provide a fruit juice extracting apparatus in which parts that are contacted by the fruit juice are so mounted that an unskilled operator can quickly and easily remove them, as for cleaning, and reinstall them for subsequent operation.

Another object is to provide a fruit processing apparatus having readily adjustable means for positively attaining accurate relative positioning of its operating parts.

Another object is to provide means for aligning operative parts of the apparatus and for positively preventing accidental displacement of the same from accurate alignment.

Another object is to provide means in a fruit processing apparatus which permit operation of the apparatus only when various cooperating parts are in operating position.

These and other objects and advantages of the present invention will become apparent from the following description and the accompanying drawings, in which.

The mode of operation of the machine of the present invention insofar as the extraction of juice from whole fruit is concerned, is the same as that disclosed in United States Patent 2,780,988 of Wilber C. Belk et al. for Method of and Apparatus for Processing Whole Fruit. Therefore, in the present disclosure reference to structure which is related closely to the machine of the above identified patent will be dealt with briefly.

In general, the juice extracting machine 20 of the present invention comprises an upright frame or support structure 22 (FIGS. 1, 2 and 3) upon the top of which is a drive D (FIGS. 1 and 3) that provides driving power for reciprocating certain components of a juice extracting mechanism E (FIGS. 1, 2, 4 and 8) which is below the drive D, within the frame 22. Such reciprocatory movement effects operation of a fruit feeder F (FIGS. 1, 2, 3, 10 and 11) which is mounted adjacent the drive D at the front of the machine. During each juice extracting cycle of operation performed by the machine 20 the fruit feeder F removes fruit, e.g., oranges, from a supply of the same within the machine, and feeds the fruit singly to the extracting mechanism E.

Figure 1:
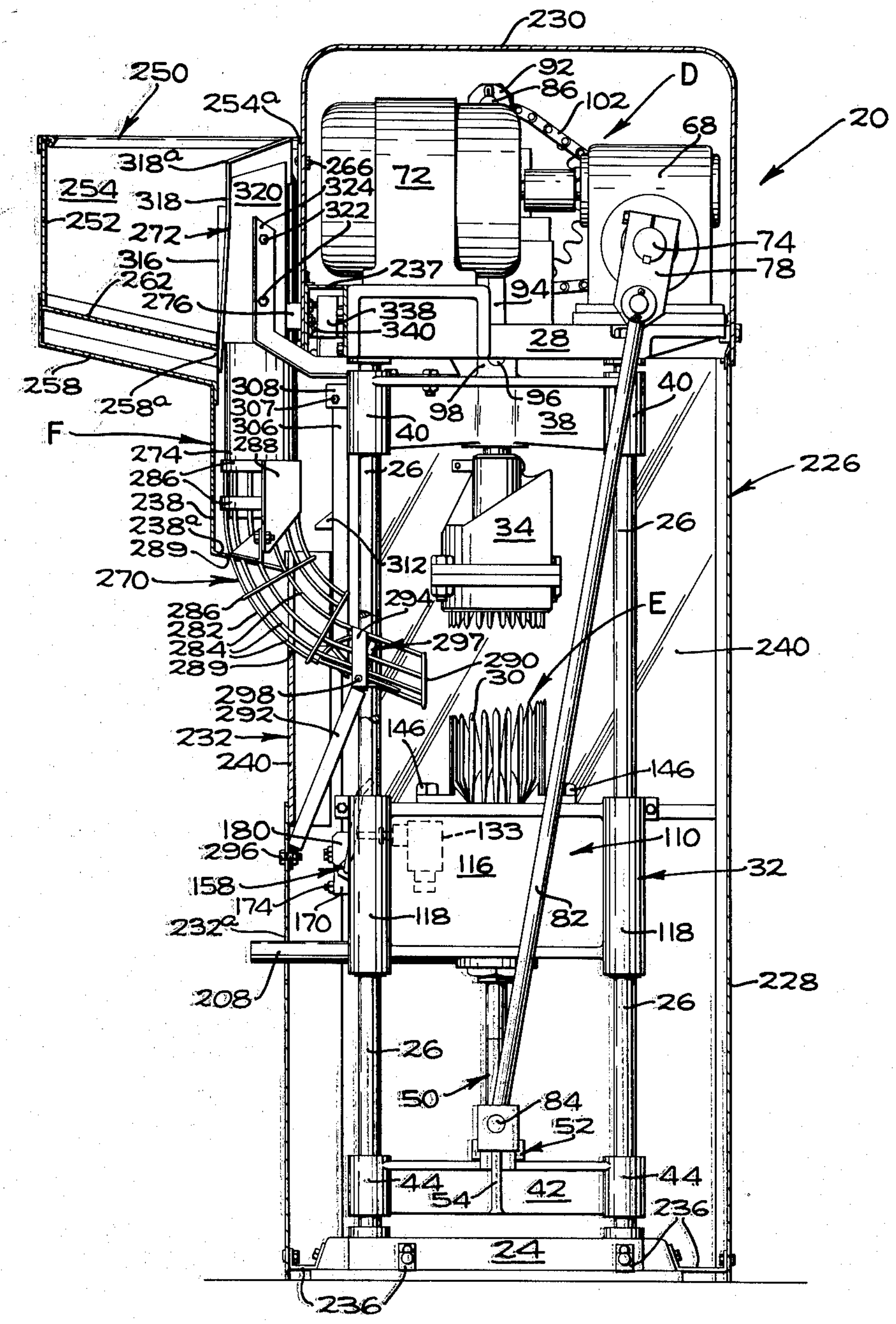
FIG. 1 is a side elevation view of a machine incorporating the present invention with certain parts shown in section to disclose the inner structure of the machine.
Figures 3, 4:
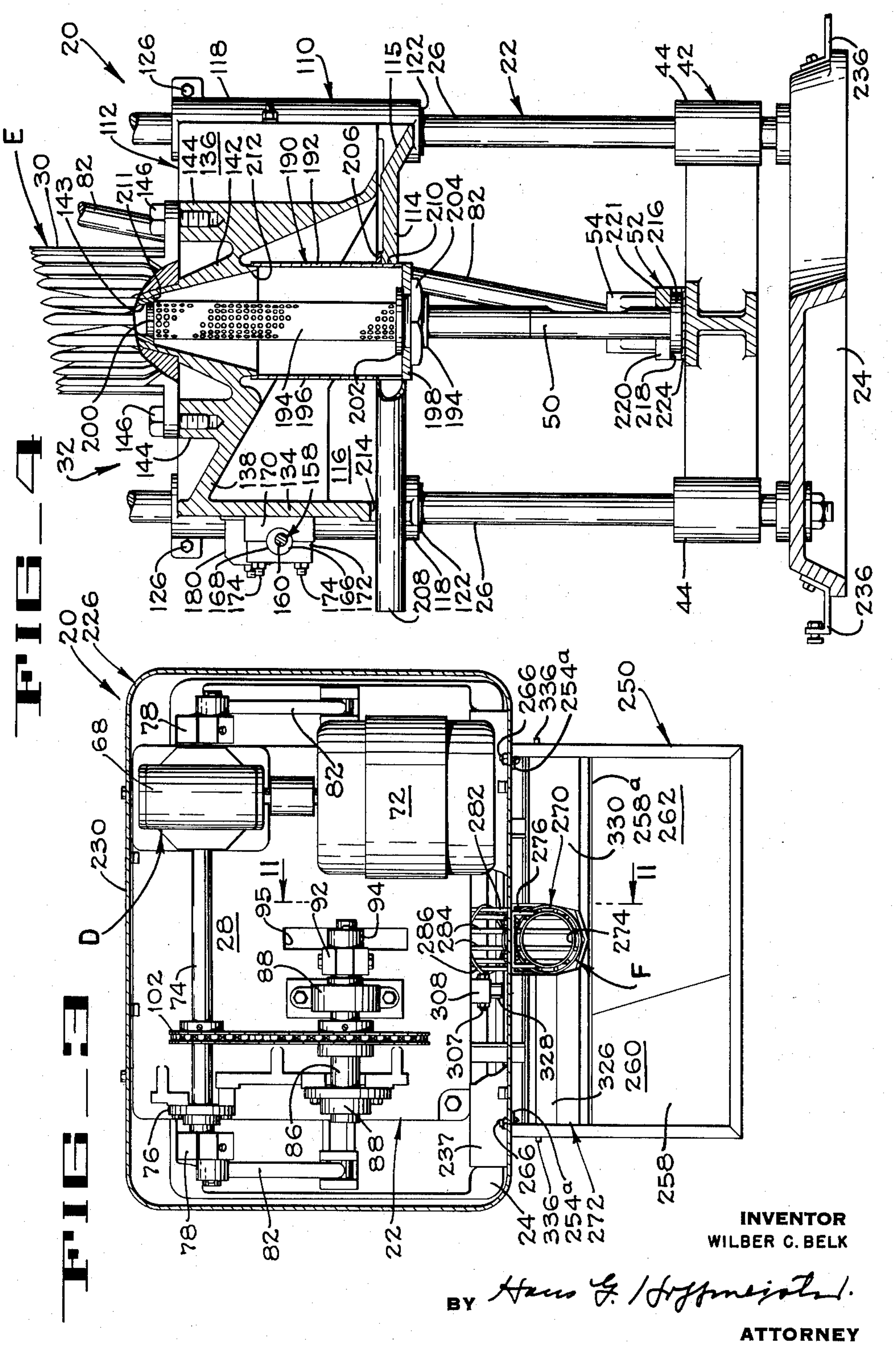
FIG. 3 is a plan view of the present machine with a portion of the housing broken away.
FIG. 4 is an enlarged, vertical section of the lower part of the present machine taken along lines 4—4 of FIG. 2 with the housing removed.

Referring to FIGS. 1, 2, 3, 4 and 8, the upright frame 22 of the machine includes a base 24 to which four vertical rods 26 are affixed adjacent the corners. At their upper ends, the rods 26 are secured to a drive support plate 28 (FIGS. 1 and 3). The base 24 and support plate 28 in conjunction with the rods 26 form the support structure or frame 22 which has suitable rigidity to maintain the rods 26 in parallel arrangement.

The components of the juice extracting mechanism E (FIGS. 1, 2, 4 and 8) are mounted in the frame 22 upon the rods 26 between the base 24 and drive support plate 28 for cooperative action. A lower cup 30 for receiving a fruit and supporting the same during the extracting operation is disposed with its central axis centered with respect to the frame 22 and is mounted on the rods 26 by means of a mounting assembly 32 (FIGS. 1, 2, 4 and 8) that rigidly but removably supports the cup 30 in a predetermined position.

An upper cup 34 (FIGS. 1, 10 and 11) for engaging the fruit within the lower cup 30 to squeeze the juice from the fruit is of similar construction to the lower cup 30 and is removably secured on a crosshead 38 for vertical reciprocation therewith with the central axis of the cup 34 in alignment with the central vertical axis of the fruit receiving cup 30. Mounting bosses 40 at the four corners of the crosshead 38 mount the crosshead upon the rods 26 for vertical, reciprocatory movement toward and away from the lower cup. The cups 30 and 34 are similar in design and operation to the fruit engaging cups disclosed in the previously mentioned Belk et al. patent. Therefore, a detailed description of the cups and their operation will not be given herein.

Another crosshead 42 (FIGS. 1, 2, 4 and 8) is disposed below the lower cup mounting assembly 32 and is provided with bosses 44 at the four corners to mount the crosshead 42 on the rods 26 for vertical, reciprocatory movement. At the center of the crosshead 42 is an orifice tube or plunger 50 that is removably secured thereto by means of a bracket 52 and projects vertically upward from the crosshead 42. Arms 54 projecting from opposite sides of the crosshead 42 form lateral extensions of the crosshead. Each arm 54, adjacent its outer end, is formed with a vertical slot 56 thereacross (FIGS. 2, 3 and 8) which is open at the top. The slidable manner of mounting the crosshead 42 upon the rods 26 permits reciprocatory movement of the orifice tube 50 toward and away from the lower, stationary cup 30. Both in construction and in operation, the orifice tube 50 resembles the orifice tubes of the aforementioned Belk et al. patent.

Figures 8, 9:
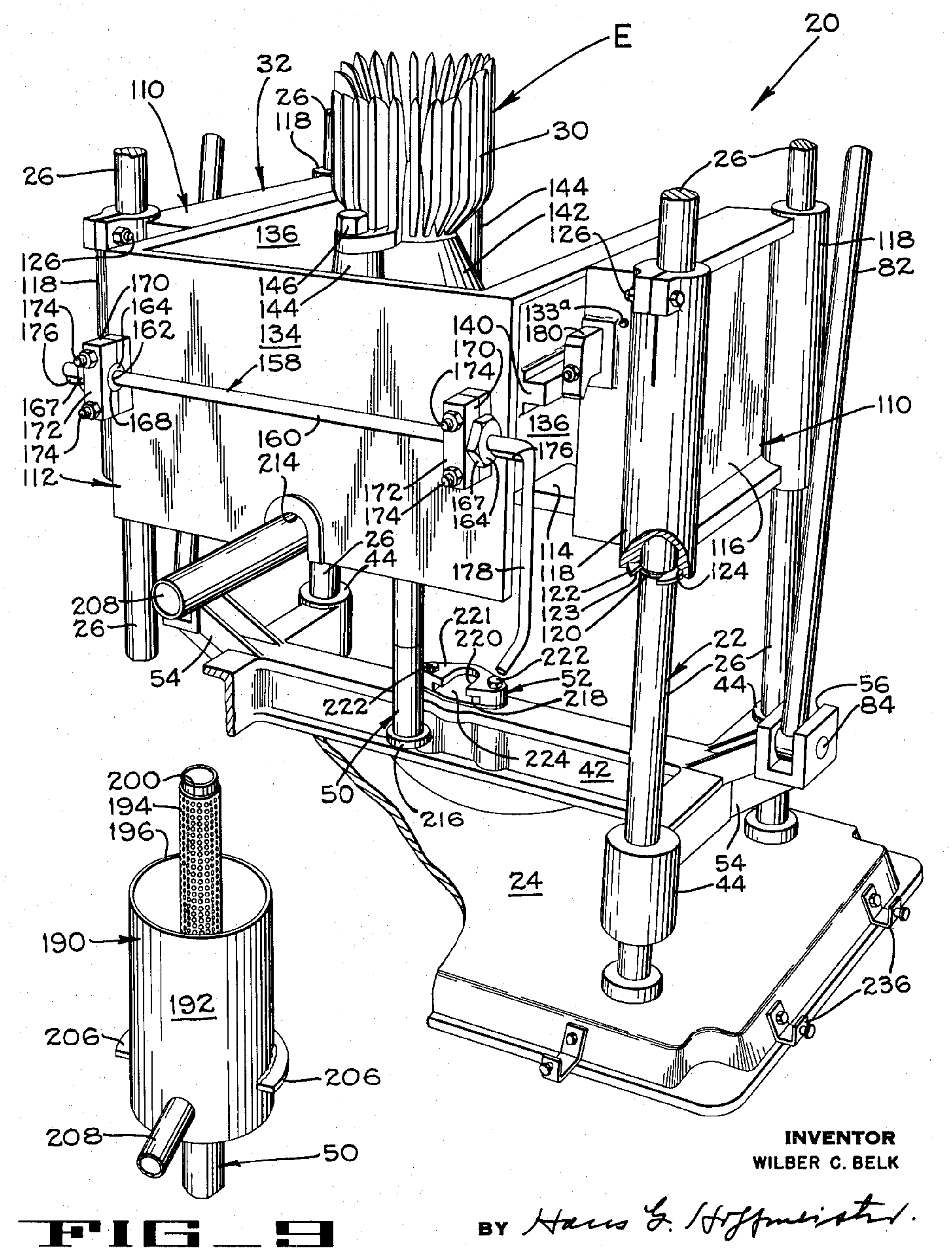
FIG. 8 is a perspective partly broken away of the lower portion of the machine shown in FIG. 4, with certain operating parts thereof in a partly assembled condition.
FIG. 9 is an enlarged perspective detail of the juice accumulator constituting a part of the present machine.

The drive D (FIGS. 1 and 3) comprises a speed reducing power transmission 68 suitably coupled to a motor 72 to drive a main shaft 74. The shaft 74 extends transversely of the machine and is journalled in the housing of the speed reducer 68 and in a bearing 76 fixed to the plate 28. Opposite ends of the shaft 74 are provided with crank arms 78 which are keyed or otherwise secured to the shaft 74 for rotation therewith. Connecting rods 82 are rotatably secured at their upper ends in a suitable manner to the crank arms 78 while the lower ends are retained in the slots 56 of the arms 54 on the crosshead 42 by means of wrist pins 84 (FIGS. 1 and 8). Upon each revolution of the main shaft 74 of the drive D the lower crosshead 42 and orifice tube 50 are raised and lowered once.

The upper juice extracting cup 34 is moved in timed relation with, and oppositely to, the movement of the orifice tube 50 therebelow. For this purpose, the transmission 68 of the drive D is provided with a countershaft 86 (FIG. 3) which is journalled in bearings 88 on the plate 28. The inner end of the countershaft 86 is provided with a crank arm 92 to which the upper end of another connecting rod 94 is pivotally attached in any suitable manner. The connecting rod 94 extends through an aperture 95 in the drive support plate 28 and is pivotally connected at its lower end by means of a pin 96 (FIG. 11) to a pair of closely spaced lugs 98 on the crosshead 38. The countershaft 86 is rotated in timed relation to the main shaft 74 of the transmisison 68 by means of an interconnecting sprocket and chain drive 102. For the purpose of precisely timing the stroke of the orifice tube 50 to that of the upper cup 34 suitable angular adjustment of the countershaft 86 may be made, by means not shown. As explained in the aforementioned Belk et al. patent, the juice extracting stroke of the orifice tube occurs at a time just before the cup 34 most closely approaches the lower cup 30.

Figure 5:
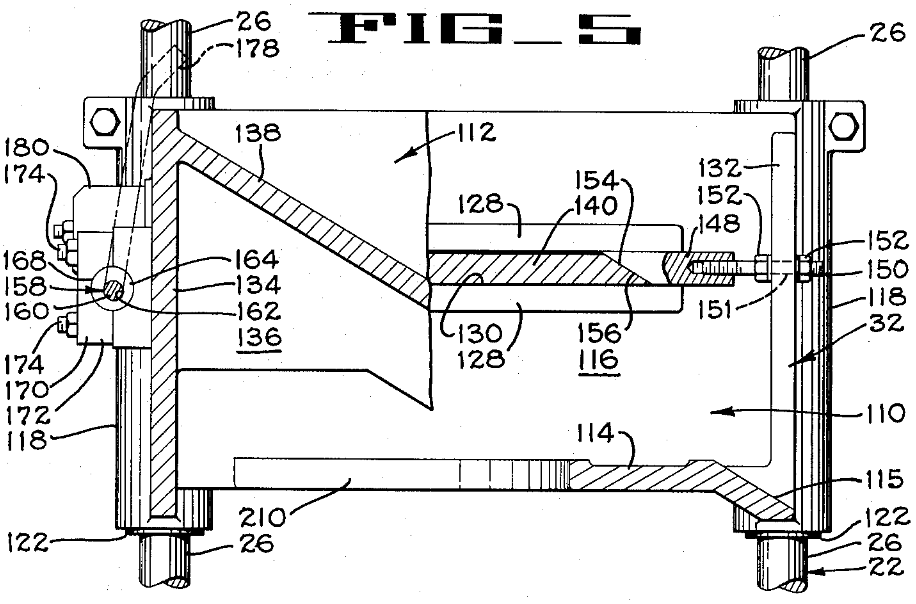
FIG. 5 is a fragmentary vertical section, further enlarged and taken along lines 5—5 of FIG. 2, with certain parts broken away.

The construction of the lower cup mounting assembly 32 and associated juice contacting components as well as the manner of attaching the orifice tube 50 to the crosshead 42 aid materially in adapting the machine of the present invention for use in such places as supermarkets, where it is impracticable to install the apparatus in the immediate vicinity of washing and sterilizing facilities. Accordingly, the lower cup mounting assembly 32 is made in two main parts comprising a stationary mounting member or receiver member 110 (FIGS. 4, 5 and 8) which is removably mounted in predetermined position on the rods 26 and a cup carrier 112 which is slidable into and out of the receiver 110. The receiver 110 is of channel shape (best shown in FIG. 8), having a floor 114 and lateral upstanding side walls 116 which are provided with elongate, cylindrical mounting sleeves 118 at the front and rear so as to mount the receiver on the rods 26. Adjacent the rear of the floor 114 (FIG. 4) is a portion 115 along the edge of the floor that is inclined downwardly and rearwardly.

An annular groove 120 is formed in each rod 26 (only one groove 120 is shown, FIG. 8), the four grooves being at uniform height. A washer 122 having an open ended slot 123 of a width substantially equal to the minimum diameter of the grooves is received in each groove 120. The receiver 110 rests with the bottoms of counterbored recesses 124 that are formed in the lower ends of the sleeves 118 upon the washers 122. The sides of the recesses 124 which encircle the washers prevent their removal from the grooves 120 until such time as the mounting member 110 is raised on the rods to clear the washers. Accidental upward movement of the receiver 110 is prevented by clamping the upper end of each sleeve 118 to the rods by means of a nut and bolt 126 in a well known manner.

It is the purpose of the mounting member 110 to slidably support the lower cup carrier 112 in a manner permitting its easy removal from the machine. Accordingly, the mounting member 110 is provided with two vertically spaced, horizontally extending projections 128 (FIG. 5) on each side that form a guideway 130 therebetween (only one of which is shown) on the inner surface of the walls 116. Each side wall 116 is provided with an inwardly directed, vertical flange 132 (only one of which is shown) at the rear of the receiver 110. Mounted interiorly of the receiver 110 on one of the walls 116 above the guideway 130 thereof is a normally open safety switch 133 (FIG. 1) that is operatively connected in the power supply line (not shown) of the drive motor 72. The switch 133 is provided with an actuator 133*a* (FIGS. 6, 7 and 8) that projects forwardly through the front of the receiver 110 (see FIG. 8).

The lower cup carrier 112 (FIGS. 4, 5 and 8) comprises a vertical front wall 134, opposite vertical side walls 136 and a web 138. The web 138 extends between the side walls 136 and is inclined downwardly from the top of the front wall rearwardly of the carrier. Each of the side walls 136 of the carrier is provided with a horizontal tongue or spline 140 (FIGS. 5 and 8) which is slidable in a respective one of the guideways 130 of the receiver 110 in order to slidably mount the carrier in predetermined vertical relation to the receiver. The inclined web 138 of the carrier 112 (FIG. 4) ends inwardly of the rear of the carrier and has an upstanding, hollow, frusto-conical formation 142, the upper end of which fits into the center of the lower cup 30. The frusto-conical formation is in communication by means of an axial opening 143 with the interior of the cup 30 in a manner and for a purpose disclosed in the beforementioned Belk et al. patent. Two posts 144 are provided on the web 138 of the carrier 112 and threadedly receive bolts 146 which secure the lower cup 30 to the carrier 112.

Suitable stops 148 (only one of which is shown, FIG. 5) are located toward the rear of the two guideways 130 in position to arrest rearward movement of the carrier 112 relative to the mounting member when the carrier 112 arrives in its operating position. Each stop 148 is threadedly mounted upon a stud 150 that extends through a hole 151 in one of the previously mentioned flanges 132 of the mounting member 110 in alignment with the associated guideway 130. The studs 150 are retained in adjusted axial position in the flanges by nuts 152 at opposite sides of the flanges 132. It will be noted (FIG. 5) that the rear ends of the splines 140 are tapered, each having a downwardly and rearwardly inclined face 154. Similarly, the forward ends of the stops 148 are tapered, each having an upwardly and forwardly inclined face 156. By appropriate manipulation of the nuts 152 upon the studs 150 the stops 148 can be set so that their inclined faces 156 engage the inclined faces 154 on the splines 140 of the carrier 112 to interrupt rearward movement of the carrier 112 in the receiver 110 when the lower cup 30 has attained a position of axial alignment with the upper cup 34. When the carrier 112 is located as described the rear edge of the inclined web 138 of the carrier is over and projects rearward beyond the forward edge of the inclined portion 115 of the receiver floor 114. The direction of inclination of the cooperating faces 156 and 154 of the splines and stops, respectively, assures that the rear end of the carrier 112 cannot move vertically in the receiver 110 when the carrier is in its operative position.

The lower cup carrier 112 is positively retained in the above described operating position with the splines 140 of the carrier in engagement with the stops 148 of the receiver 110 by means of a lock 158 (FIGS. 2, 4, 5, 6 and 7). The lock 158 comprises a shaft 160 that is rotatable in holes 162 extending through two shaft mounting bushings 164. The holes 162 are located eccentrically with respect to cylindrical body portions 166 of the bushings 164, each of which is provided with a head 167. In order to mount the lock 158 upon the carrier 112 the cylindrical bodies 166 of the bushings 164 (FIG. 8) are journalled for rotary adjustment in aligned openings 168 in two mounting brackets 170. One mounting bracket 170 (FIG. 2) is located adjacent each lateral edge of the front wall 134 of the carrier 112 so that the shaft 160 extends horizontally across the front of the carrier 112.

The mounting brackets 170 are of a split type, and each bracket includes a clamping member 172 (FIG. 5) which is retained in place by means of bolts 174. This manner of mounting the bushings permits the bushings 164 to be individually turned by means of a wrench applied to the heads 167 in order to adjust the alignment of the eccentrically located holes 162.

Figure 2:
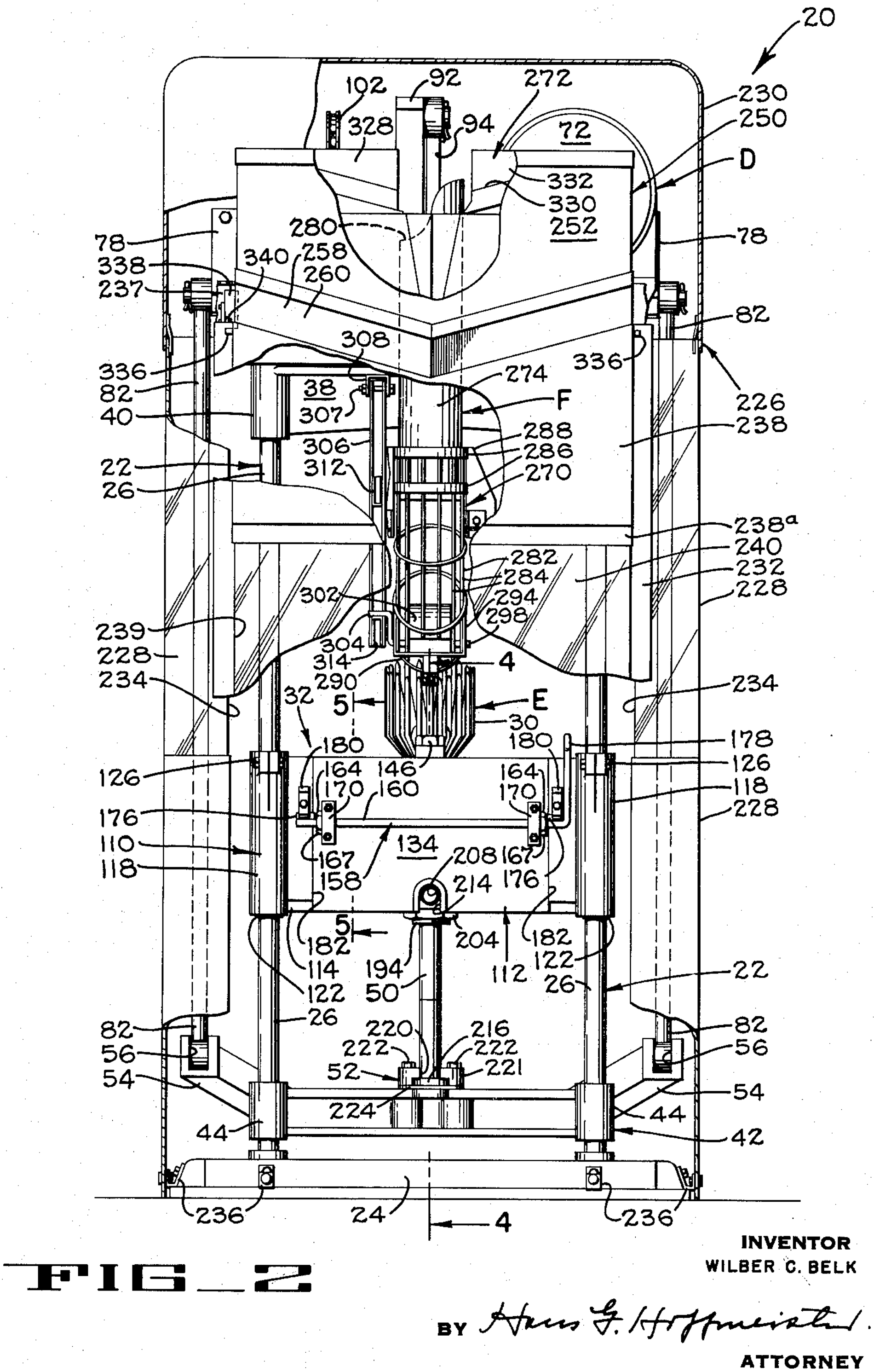
FIG. 2 is a front elevation view of the machine shown in FIG. 1, with certain parts broken away.
Figures 6, 7:
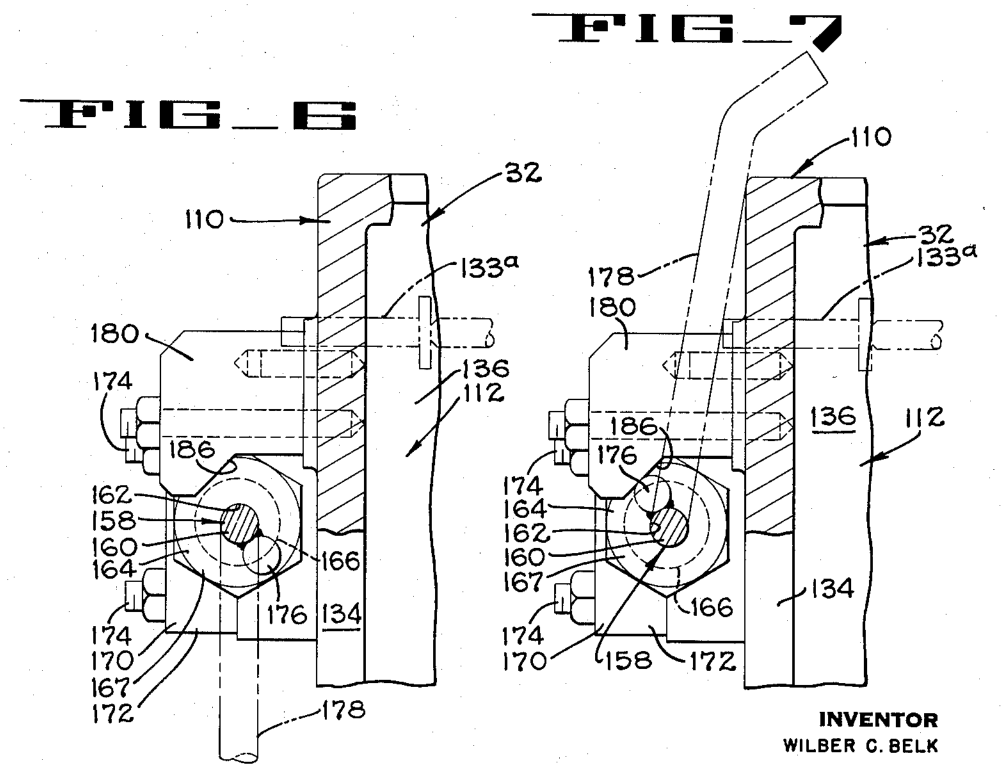
FIGS. 6 and 7 are enlarged fragmentary views of a locking mechanism shown in FIG. 2, illustrating the locking mechanism in unlocked and in locked conditions, respectively.

The shaft 160 of the lock 158 is provided, adjacent its opposite ends (FIGS. 6 and 7) with radially extending lobes 176. In FIG. 2 it will be noted that the lobes 176 are located beyond the lateral edges of the front wall 134 of the carrier 112. At the right hand end of the shaft 160 (FIGS. 2 and 8) is a radially extending handle 178 by which the shaft 160 can be turned in the holes 162 of the bushings 164. The angular distance between the handle 178 and the lobes 176 on the shaft 160 is such that the lobes are below the shaft 160 when the handle is hanging down (FIG. 6). When in this position the lock 158 is ineffective as shown in FIG. 8, and movement of the cup carrier 112 into or out of the receiver 110 is unobstructed.

The carrier 112 can be positively locked in its operating position by means of the lobes 176 of the locks 158 in cooperation with two suitably shaped lugs 180 of the receiver. One of the lugs 180 (FIGS. 6 and 7) is fixed to the front of the receiver 110 at each lateral edge of an opening 182 provided between the walls 116 for reception of the carrier 112. Referring again to FIGS. 6 and 7, it will be noted that the lugs 180 are beaklike in profile, each providing an upwardly and rearwardly inclined surface 186. The height at which the lugs 180 are located on the receiver 110 is such that the surfaces 186 are above and in front of the lock shaft 160 when the carrier is in operating position. Therefore, when the carrier 112 is in its operating position the lock handle 178 can be swung from the position shown in FIG. 6 into the position shown in FIG. 7, causing the lobes 176 on the shaft 160 to be brought into frictional engagement with the surfaces 186 of the lugs 180. The bushings 164, which are adjustable in the mounting brackets 170, can be turned by a wrench as hereinbefore stated, so as to vary the spacing of the lock shaft 160 from the inclined camming surface 186 of the lugs 180. The bushings 164 should be so adjusted that when the carrier 112 is in the position in which the fruit holding cup 30 carried thereby is accurately in alignment with the upper, vertically reciprocable cup 34, the lock shaft 160 is spaced from the camming surfaces 186 of the lugs 180 a distance equal to the effective height of the lobes 176. This permits the lock shaft 160 to be turned to the position in which it is illustrated in FIG. 7 only when the lower cup carrier 112 attains its final operating position. If when it is attempted to turn the handle 178 of the lock 158, the carrier is so spaced forward from its true, operating position but positioned so that the lobes 176 will strike the upwardly and rearwardly inclined camming surfaces 186 continued upward movement of the handle 178 will cause the lobes to bear against the surfaces 186 in such a manner as to cam the carirer 112 the remaining distance to its operating position. Thereafter, continued turning of the handle 178 to the rearwardly sloping position illustrated in FIG. 7 will cause the lobes 176 to move slightly beyond the "dead center position" illustrated in FIG. 7 wherein accidental release of the lock 176 is prevented. After turning the bushings

164 so as to obtain the desired adjustment thereof, they should be clamped in placed by tightening the clamp members 172 of the brackets 170 by means of the bolts 174.

In addition to assuring accurate horizontal positioning of the carrier 112, the lock 158 presses the front end of the carrier down, thereby assuring that the splines 140 rest firmly upon the lower ones of the horizontal projections 128 on the receiver walls 116 so that the vertical relation of the carrier 112 with respect to the receiver 110 will not change while the lock 158 is set. Additionally, the lobes 176 of the lock 158 bear against the lugs 180 in such a way that the carrier is positively gripped between the stops 148 and the oblique surfaces 186 of the lugs 180. This prevents any horizontal shifting of the carrier 112 with respect to the receiver 110.

When the handle 178 is in the FIG. 7 position it is in positive engagement with the actuator 133*a* of the safety switch 133 in the circuit of the motor 72 and holds the switch in closed condition. However, upon displacement of the handle 178 from its FIG. 7 position, the switch opens, thus requiring that the lower cup carrier 112 be locked in operating position before the machine can be operated. Frictional engagement of the lobes 176 with the lugs 180 as well as the slight rearward inclination of the handle 178 resists accidental disengagement of the lock 158.

A juice accumulator assembly 190 (FIGS. 4 and 9) which cooperates with both the carrier 112 and the receiver 110 of the lower cup assembly 32 is provided to entrap the juice extracted from the oranges during operation of the machine. The accumulator assembly 190 comprises a sump 192 and a finisher tube 194. The sump 192 comprises a hollow cylindrical body 196 closed at the lower end by a centrally apertured bottom 198. The finisher tube 194 (FIG. 4) which is perforated throughout substantially its entire length to permit the passage of juice therethrough during juice extracting operations, is provided adjacent its upper end with a shoulder 200. Adjacent the lower end, the finisher tube 194 is provided with a flange 202 below which the tube is of suitable size to fit the aperture in the bottom 198 of the sump. In assembly of the sump 192 and finisher tube 194 the tube is located coaxially of the sump with the lower end of the tube extending through the aperture in the bottom 198 of the sump. The flange 202 rests against the bottom 198 interiorly of the sump and by means of a nut 204 that is threaded onto the lower end of the tube below the bottom 198, the finisher tube and the sump are held in assembled relation. On its exterior the sump is provided with a flange 206 that projects from the rear half of the circumference of the cylindrical body 196 a short distance above the bottom 198 (see FIG. 9). Additionally, a discharge tube 208 which communicates with the interior of the sump is fixed to and projects radially of the body from a point between the ends of the flange 206.

The floor 114 of the receiver 110 is provided with a slot 210 (FIGS. 4 and 5) that extends toward the front of the machine from the center of the receiver. The slot 210 is open at the front of the floor 114, and rounded at its inner end, and the width of the slot 210 is greater than the diameter of the cylindrical sump 192. The bottom end of the sump 192 which is slidable in the slot 210 is located therein with the flange 206 of the sump on the floor 114 at the inner end of the slot when the juice accumulator 190 is in operative position in the lower cup mounting assembly 32. In such a position of the sump the shoulder 200 at the upper end of the finisher tube 194 engages a mating seat 211 interiorly of the frusto-conical formation 142 about the opening 143 and in axial alignment with the lower cup 30. This engagement between shoulder 200 and seat 211 prevents upward movement of assembly 190. It will further be apparent that the cylindrical body 196 of the sump at its upper end is in telescoping relation with a circular lip 212 at the bottom of the frusto-conical formation 142 of the carrier 112. The finisher tube 194 slidably receives the upper end of the orifice tube 50 for vertical reciprocation therein in coaxial relation to the lower cup 30 when the accumulator assembly 190 is in operative position. The purpose and manner of operation of the finisher tube 194 are disclosed in the previously mentioned Belk et al. patent.

The above described manner of slidably mounting the juice accumulator assembly 190 in the slot 210 of the receiver 110 and retaining the accumulator in the carrier 112 makes it clearly apparent that the assembly 190 is held against axial displacement but can slide forward of the receiver 110 with the carrier when the carrier is removed from or inserted into the machine. It will be noted (FIGS. 2, 4, 5 and 8) that the front wall 134 of the carrier 112 is provided in its bottom edge with a rounded notch 214 through which the discharge tube 208 of the sump projects when the accumulator assembly is in operative position in order to retain the tube in operative position.

Juice ladened pulp that is forced into the finisher tube 194 during the juice extracting operation is compressed by the plunger action of the orifice tube 50 as disclosed in the Belk et al. patent. Thereupon, pulp free juice is forced through the perforations in the finisher tube 194 by the action of the orifice tube 50 and the juice is entrapped and accumulated in the sump 192. Thereafter, the juice drains from the sump through the tube 208. Juice that is discharged from the tube 208 may be collected in any suitable manner (not shown).

The previously mentioned bracket 52 by which the orifice tube 50 is removably secured to the lower crosshead 42 further facilitates the easy removal of the juice contacting components from the machine of the present invention. Accordingly, an enlarged head 216 (FIGS. 2, 4 and 8) on the lower end of the orifice tube 50 is slidable in a channel 218 which is formed in the bottom of the bracket 52. A slot 220 for the purpose of receiving the orifice tube adjacent the head 216 is also formed in the bracket in a web 221 which interconnects the opposite ends of the bracket. The slot 220 is open at the front of the web and both the slot and channel 218 are in aligned superposed relation longitudinally of the machine. In securing the bracket 52 to the crosshead by bolts 222 a thin wear strip 224 is interposed between the bracket and the crosshead. The orifice tube is retained against vertical displacement relative to the crosshead by the head 216 which is held snugly by the channel 218 against the wear strip. This manner of mounting the orifice tube 50 permits its rapid and easy installation and removal and precludes clatter that might arise upon reciprocation of the orifice tube during operation of the machine.

Let it be assumed that the carrier 112 with the lower cup 30 attached, the juice accumulating assembly 190, and the orifice tube 50 have been removed from the machine 20 for cleaning and servicing and are ready to be reinstalled. First the upper end of the finisher tube 194 of the juice accumulator assembly 190 is inserted from below into the frusto-conical formation 142 of the carrier. The discharge tube 208 of the sump 192 should be aligned with the notch 214 of the carrier wall 134 so that the accumulator assembly 190 can enter the bottom of the carrier 112 far enough for the shoulder 200 at the upper end of the finisher tube 194 to engage the seat 211 and for the open, top end of the sump to attain overlapping relation with the lip 212 on the underside of the carrier 112. When the accumulator assembly 190 is so located in the carrier 112 the carrier is ready to be installed in the receiver 110. In accomplishing this operation the carrier is raised to a position higher than and in front of the receiver and is brought into centered location relative to the opening 182 of the receiver. The carrier is then lowered and moved toward the rear of the machine in order to bring the rear ends of the two splines 140 of the carrier 112 into the front ends of the guideways 130 on the lateral walls 116 of the receiver 110. Thereafter, while the accumulator assembly 190 is held in place in the carrier both the assembly 190 and the carrier 112 are moved as a unit toward the rear of the machine. During this movement the carrier is guided by the interengagement of its splines 140 in the guideways 130 of the receiver. After slight rearward movement of the carrier 112 the bottom end of the sump 192 enters the slot 210 in the floor 114 of the receiver 110 and the semi-circular flange 206 is brought into engagement with the upper surface of the floor 114 bordering the slot 210.

Before the carrier and accumulator assembly are finally positioned in the receiver the orifice tube 50 must also be reinstalled in the machine. The upper end of the orifice tube 50 is inserted from below into the finisher tube 194 and is then moved axially of the finisher tube, until the head 216 is brought into horizontal alignment with the channel 218 in the bracket 52. Then the carrier 112, the accumulator assembly 190, and the orifice tube 50 are pushed farther toward the rear of the machine until the splines 140 of the carrier engage the properly adjusted limit stops 148 of the receiver as previously explained and the head 216 of the orifice tube enters the bracket 52. The stops 148 assure that the lower cup 30 on the carrier 112, the finisher tube 194 and the orifice tube 50 come to rest with their common axes in alignment with the axis of the upper cup 34 so that the various operating parts of the juice extractor mechanism E will interengage properly. When the carrier 112 is positioned in the receiver 110 the inclined web 138 of the carrier and the inclined portion 115 of the receiver form, in effect, a continuous inclined surface from which peel oil or such material can easily descend.

Lastly, the lock 158 at the front of the lower cup mounting assembly 32 is manipulated to move the lock handle 178 from the FIG. 6 position into the FIG. 7 position. When the handle 178 is disposed in the FIG. 7 position, the carrier is locked in place to assure that all of the removable parts and juice contacting components of the mounting assembly 32 are securely locked in operating position and that the safety switch 133 is closed. Removal of the various components mentioned above can be accomplished by a reversal of the steps previously described.

As shown in FIGS. 1, 2 and 3 the frame 22 inclusive of the extracting mechanism E and the drive D is enclosed in a housing 226. The housing comprises a main enclosure 228 about the lower part of the machine, a drive cover 230 and a readily removable front panel 232. The front panel 232 is suitably apertured as at 232*a* so that the discharge tube 208 can project from the sump 192 through the panel 232 to the exterior of the housing 226. The main enclosure 228 surrounds the frame 22 from the base 24 to the drive support plate 28 except for a vertically elongate opening 234 (FIG. 2) at the front of the machine. A plurality of brackets 236, which are affixed in any convenient manner to the base 24, mount the main enclosure in predetermined position in relation to the frame 22. The drive cover 230, which incloses the upper part of the machine 20 on its four sides as well as the top, is located at the top of the main enclosure with the sides of the cover overlapping the sides of the enclosure 228. In order to secure the upper part of the housing 226 against undesirable movement relative to the frame 22, the drive cover is bolted or otherwise attached to the drive support plate 28 at the rear of the machine and to a horizontal channel 237 fixed to the plate 28 at the front of the machine. The beforementioned vertically elongate opening 234 at the front of the machine (FIG. 2) is defined on opposite sides by the main enclosure 228 and on the top by the cover 230. The front panel 232 includes a forwardly offset portion 238 (FIGS. 1, 10 and 11) and closes the opening 234 in the housing 226. Since the front panel 232 must be removed to permit servicing the removable parts of the lower cup mounting assembly 32, the panel 232 is removably secured in place.

In order to make viewing the operation of the machine 20, in such places as supermarkets, a stimulus to the purchase of freshly prepared citrus juice, the housing 226 (FIGS. 1, 2 and 10) is provided with windows 239 in the panel 232 and sides of the main enclosure 228. Suitable panes 240 (FIGS. 1, 2 and 10) of shatter resistant, transparent material are provided in the windows as a precaution against injury to anyone who might otherwise reach into the moving machine.

Figure 15:
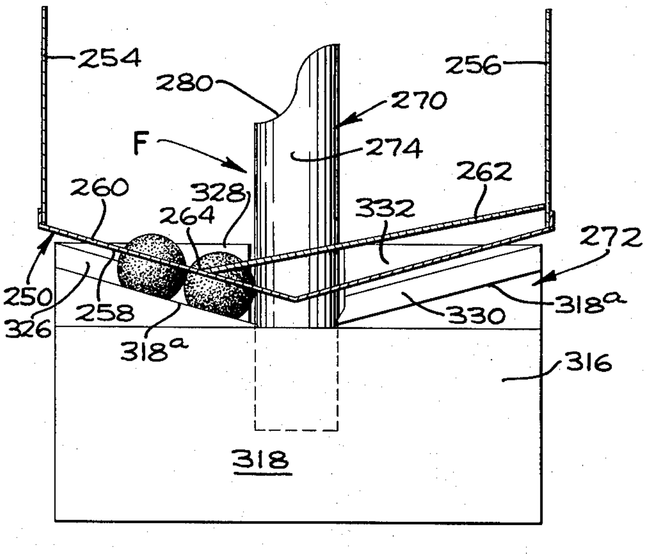
FIGS. 15 and 16 are diagrammatic front and side views similar to FIGS. 13 and 14, respectively, showing the same portions in another operational position.

A supply of juice yielding fruit (e.g., oranges) is normally maintained in a supply hopper 250 that is located high at the front of the machine. The hopper 250 (FIGS. 1, 2, 3, 10, 13 and 15) is rectangular in plan having a vertical front wall 252 and opposite, vertical side walls 254 and 256. A bottom 258 of the hopper inclines downwardly and rearwardly and is formed of two panels 260 and 262 that converge downwardly along a line 264 that is located to the left of the center of the machine (FIGS. 1, 3 and 15). It will be noted (FIGS. 1 and 11) that the edge **258*a* of the hopper bottom 258 adjacent the housing 226 is spaced from the drive cover 230. The side walls 254 and 256 have vertical flanges 254*a* at their ends adjacent the housing 226 that are clamped to the drive cover 230 by bolts 266** so as to mount the hopper.

For the purpose of removing the oranges from the hopper 250 and feeding them to the extracting mechanism E, the fruit feeder F is provided with a chute 270 that leads from the hopper 250 to a location adjacent the lower, fruit receiving cup 30. An elevator 272 (best shown in FIG. 10) of the fruit feeder F is operatively mounted in the machine so as to remove fruit from the hopper 250 and discharge the fruit into the chute for delivery to the lower or fruit receiving cup 30. The chute comprises an upper part 274 that is a straight tubular member of sufficiently large diameter for the oranges to pass through freely in single file. The tubular member 274 is located in the space between the edge **258*a* of the hopper floor 258 and the front of the drive cover and is positioned with its axis substantially on a vertical medial plane of the machine. By means of a bracket 276, the upper part 274 of the chute is attached in fixed position to the drive cover by bolts 278. The top 280 (FIGS. 2, 13 and 15) of the tubular upper part 274 is located adjacent the top of the hopper 250** and is cut away to a lower level at the left hand side.

A discharge elbow 282 (FIGS. 1, 10 and 11) forming the lower part of the chute 270 is fabricated of slender longitudinally extending rods 284 that are held in spaced relation by encircling rings 286. The discharge elbow 282 is mounted by means of a bracket 288 that is attached to the bottom **238*a* of the previously mentioned offset 238 of the front panel 232 in a manner permitting vertical adjustment of the elbow 282. The bottom 238*a* of the offset 238 as well as the pane 240 of the panel window 239 are apertured as at 289 (FIG. 10) to permit the discharge elbow 282 to extend therethrough. The diameter of the elbow 282 permits it to fit loosely at its top end exteriorly of the upper chute part 274 in order that the elbow 282 can be easily removed from the machine with the front or chute mounting panel 232. The discharge end of the elbow 282 projects inwardly of the machine 20 to a point adjacent the lower or fruit receiving cup 30. Below the lowermost ring 286 of the elbow 282 only the rods forming the bottom of the chute project toward the cup and are interconnected at their inner ends by a curved rod 290**.

A strut 292 that gives stability to the inwardly projecting, discharge end of the chute is fixed at its upper end to a U-shaped bracket 294 that is secured to the rods 284 forming the bottom of the discharge elbow 282. The lower end of the strut 292 is attached for limited vertical adjustment by a bolt 296 to the front panel 232.

The manner of mounting the discharge elbow 282 for vertical adjustment by means of the bracket 288 and the strut 292 assures that the discharge end of the chute 270 can be brought into suitable vertical relation with respect to the lower cup 30.

A timing gate 297 (FIGS. 10 and 11), located in the elbow 282 adjacent the discharge end of the chute 270 is mounted for pivotal movement in the U-shaped bracket 294 by means of a shaft 298 that extends transversely of the chute. The gate comprises a flat plate or floor member 299 of a width approaching the diameter of the elbow 282 and is fixed to the shaft so as to project longitudinally of the chute substantially the same distance both forward and rearward from the shaft 298. A plate 300 substantially perpendicular to the floor member 299 and extending thereacross is fixed to the floor member 299 above the shaft 298. The plate 300 is in the form of a V, having divergent walls **300*a* and 300*b* (FIG. 10) that form a short trough whose open top faces one end 299*a* of the floor member 299. An arcuate deflector member 302 of the gate 297, concentric with the shaft 289, extends between the outer end of the trough 300 and the other end 299*b* of the floor member 299** and upwardly of the chute.

Figure 16:
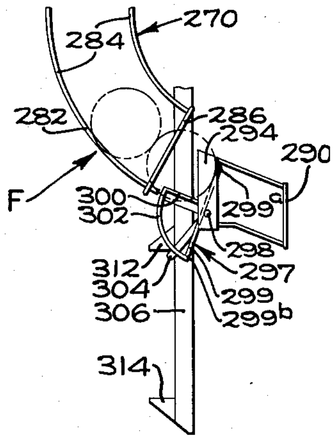

The manner of positioning the gate 297 in the chute brings the shaft 298 into substantial tangency with the elbow 282 closely adjacent two bottom rods **284*a* (FIGS. 10 and 11) of the chute 270, which are cut away in front of the gate shaft 298 to permit pivotal movement of the gate 297. When the gate 297 is disposed in the position shown in FIGS. 10, 11 and 14 with the rear end 299*a* of the floor member 299 resting upon the two rods 284*a* the deflector member 302 will block the passage of oranges from the chute. In such a position of the gate 297 a crank 304 (FIGS. 11, 14 and 16) on the gate shaft 298** projects upwardly therefrom toward the front of the machine.

The gate 297 is actuated so as to discharge one orange at a time from the chute by means of an arm 306 which is pivotally attached by a bolt 307 to a bracket 308. The arm mounting bracket 308 is fixed to the crosshead 38 adjacent the front of the machine. The manner in which the arm 306 is pivotally mounted for swinging movement toward the front and rear of the machine assures that it can be swung out of the way during removal of the carrier member 112 and the sump 192 from the machine as well as retained in engagement with the crank 304. A counterbalance in the form of a weight 310 on the rear side of the arm 306 urges the arm forward into resilient engagement with the gate crank 304. Vertically spaced abutments 312 and 314 on the front of the arm and located, respectively, above and below the crank 304, assure that the crank will be engaged by the abutments so as to move the timing gate 297 from a fruit feeding position (FIGS. 1, 10, 11 and 14) to fruit-receiving position (FIG. 16) and back to fruit feeding position during each cycle of operation of the machine.

Figure 10:
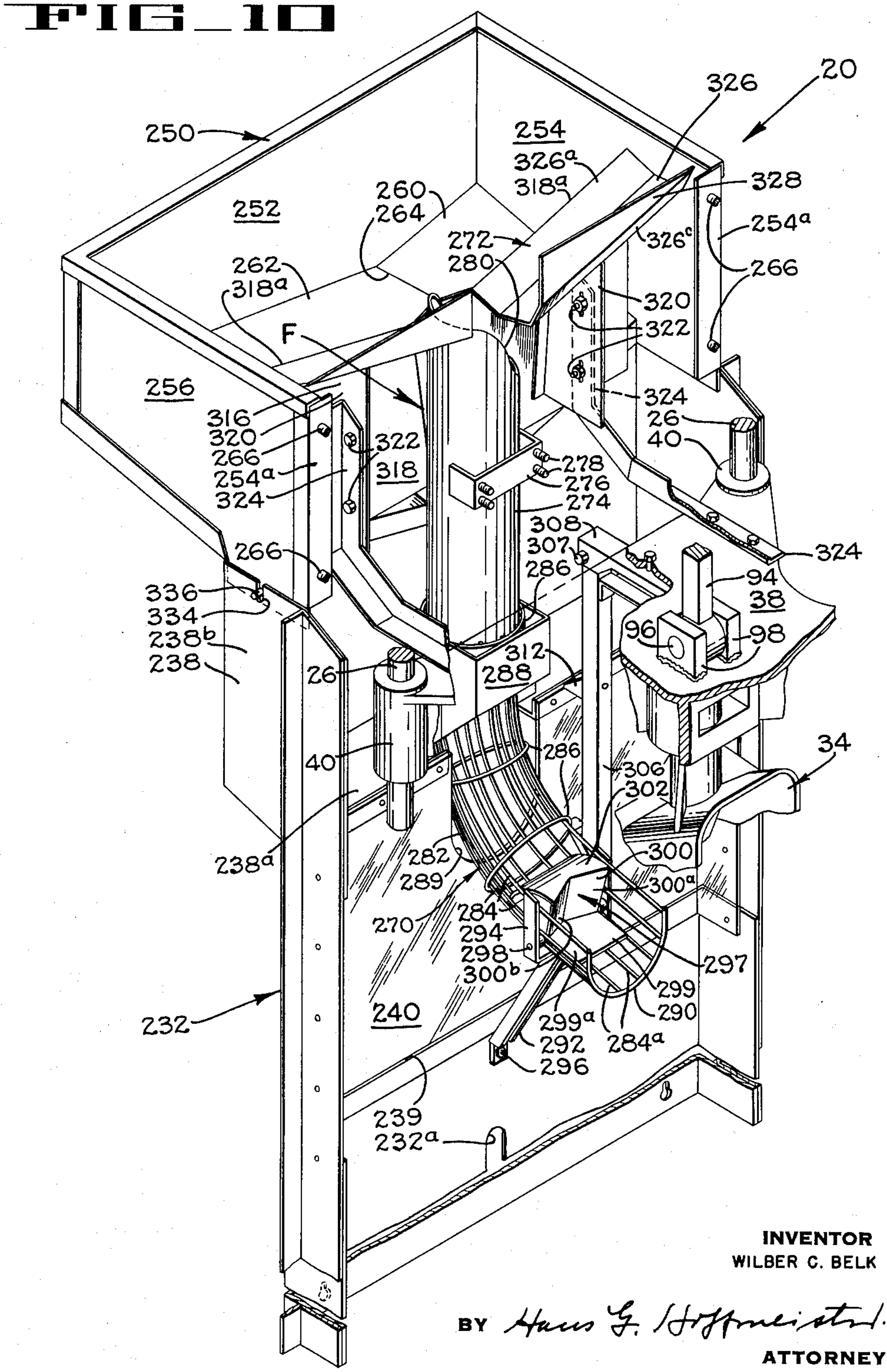
FIG. 10 is a perspective detail of a portion of the machine of the present invention showing the fruit storing and fruit feeding parts of the apparatus.
Figures 11, 12:
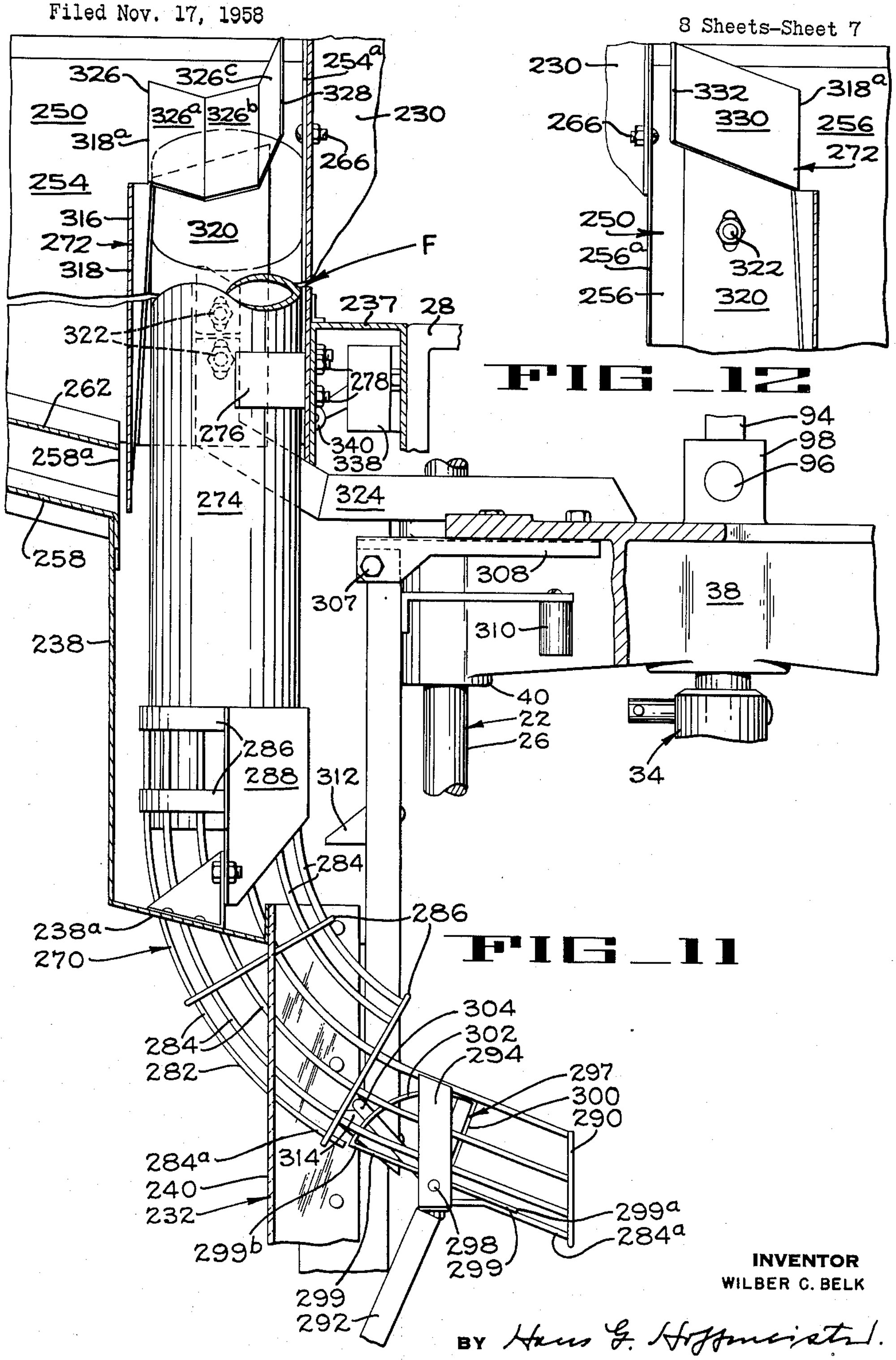
FIG. 11 is an enlarged fragmentary vertical section of the present machine showing the fruit feeder and taken along lines 11—11 of FIG. 3 with certain parts shown in elevation.
FIG. 12 is a fragmentary view of the upper part of the fruit feeder of FIG. 11, looking in the opposite direction.
Figure 13:
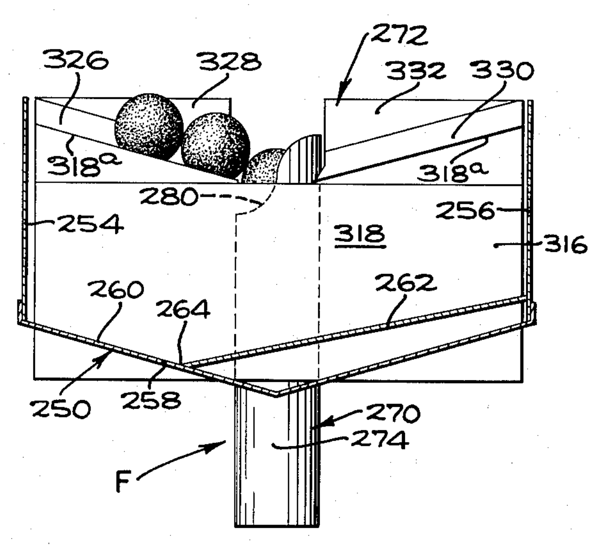
FIGS. 13 and 14 are diagrammatic front and side views showing different portions, respectively, of the fruit feeder in one operational position.

The elevator 272 previously referred to is located in the hopper 250 adjacent the drive cover 230 and comprises a member 316 providing a barrier 318 at the rear of the hopper. Vertical fins 320 on the rear of the barrier 318 are attached for vertical adjustment by bolts 322 to upstanding brackets 324 on the crosshead 38. The brackets 324 connect the elevator 272 to the crosshead 38 for up and down movement therewith. When mounted in the above described manner, the barrier 318 is disposed for unobstructed vertical movement in the space between the edge **258*a* of the hopper bottom 258 and the tubular member 274 of the chute 270 which is spaced from the bottom 258. The barrier 318 which is generally planar presents a surface to the hopper that is inclined (FIG. 1) inwardly and upwardly of the machine from the bottom edge of the barrier. At the center (FIGS. 2, 11 and 12), the barrier 318 is forwardly offset in the region of the upper part 274 of the chute 270** so as to be in substantially parallel, spaced relation to the chute. Both sides of the barrier, along its top edge 318*a*, are inclined downwardly and laterally of the hopper from adjacent the side walls 254 and 256 (FIGS. 10, 13 and 15).

On the left hand side of the elevator 272 along the top 318*a* of the barrier 318 is a trough 326 that is inclined downwardly and laterally of the hopper from adjacent the side wall 254. The trough 326 comprises a plurality of longitudinally extending plane surfaces 326*a*, 326*b* and 326*c* (FIG. 11), that are disposed in angular relation with respect to each other. At the rear of the trough 326 is an upstanding, wedge-shaped wall 328, the top of which is substantially horizontal.

To the right of the chute 270 and along the top edge 318*a* of the barrier 318 (FIG. 12) is a rectangular deflector 330 that is inclined both rearwardly and upwardly of the hopper from the edge 318*a* as well as downwardly away from the side 256 of the hopper. Along the top of the deflector 330 is an upstanding wedge-shaped wall 332, the top of which (FIGS. 10 and 13) is substantially horizontal.

When the elevator 272 is raised (FIG. 13), between juice extracting strokes of the machine, the barrier 318 in effect forms a rear wall in the hopper 250 to prevent loss of fruit through the space between the edge 258*a* of the hopper bottom and the drive cover 230. Upon lowering of the elevator 272 (FIG. 15) the barrier is moved interiorly of the offset 238 of the panel 232 so as to lower the trough 326 below the hopper bottom 258. In such a position of the trough 326 oranges roll down the inclined panels 260 and 262 of the hopper bottom and into the trough. The wedge-shaped wall 328 along the rear edge of the trough 326 assists in confining oranges to the trough during operation of the elevator. During upward movement of the elevator the deflector 330 returns to the hopper any oranges which rolled into position over the deflector when the elevator was lowered. When the elevator is in raised position the end of the trough 326 adjacent the chute 270 is above the cut out top 280 of the chute so that oranges within the trough can roll into the chute.

The manner of mounting the discharge elbow 282 of the chute 270 for removal from the machine with the chute mounting panel 232 provides easy access to the lower cup mounting assembly 32. It will be understood that easy removal and reinstallation of the chute mounting panel 232 as well as its correct location in the machine are important to the successful operation of the machine. Accordingly, the offset 238 of the panel 230 at opposite sides 238*b* (only one of which is shown, FIG. 10) is slotted vertically as at 334 in the upper edge. In order to install the chute mounting panel 232 in the machine the panel is moved so that the top end of the discharge elbow 282 is below and in vertical alignment with the upper chute part 274. When the panel 232 is so disposed it is moved upward until the slots 334 in the offset 238 engage oppositely projecting studs 336 on the sides 254 and 256 of the hopper, at which time the top of the elbow 282 encircles the lower end of the upper chute part 274. The panel 232 is then fixed in place by attachment, adjacent the bottom edge, to the base 24 by appropriate ones of the clips 236.

When installing the front panel 232 and the discharge elbow 282 it is imperative that the elbow 282 be positioned in proper operative relative with respect to the lower cup 30 before operation of the machine. In order to insure such a condition a second safety switch 338 is provided so as to be engaged by the panel 232 when the position of the panel indicates that the discharge elbow 282 is correctly positioned. The switch 338, which is normally open, is operatively connected in the power supply line (not shown) of the motor 72 in series with the other safety switch 133 and is mounted on the drive support plate 28 (FIGS. 1, 2 and 11) and within the channel 237 at the front of the machine. An actuator 340 of the switch 338 projects forwardly through a suitable aperture (not shown) in the drive cover 230 so as to be closed upon engagement of the actuator 340 by the front panel 232 when the panel is correctly located and fixed in place as described. Closing of the switch 338, which indicates that the discharge elbow 282 of the chute 270 is correctly positioned, as well as closing of the switch 133, which indicates that the lower fruit cup 30 is correctly positioned and locked in place, must be accomplished before the motor 72 can be energized.

Figure 14:
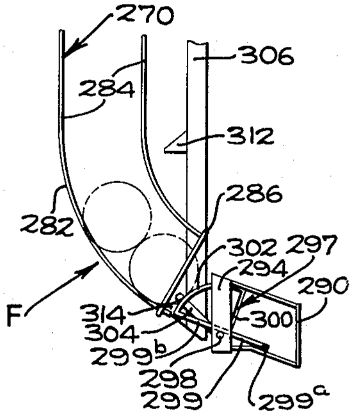

Let it be assumed that the upper crosshead 38 is raised (FIG. 13) and that oranges which have been elevated in the trough 326 of the elevator 272 to the top 280 of the upper chute part 274 have been discharged into the chute 270. The crosshead 38 will have raised the timing gate actuating arm 306 so that the abutment 314 is in engagement with the gate crank 304 to hold the arcuate deflector 302 of the gate 297 in a position to intercept the oranges supplied to the chute, as shown in FIG. 14. As operation continues and the crosshead 38 is lowered the elevator 272 is lowered to the position shown in FIG. 15 so that other oranges will roll into the trough 326. As the crosshead moves downward the timing gate 297 is pivoted counterclockwise (FIG. 16) by engagement of the upper abutment 312 on the gate actuating arm 306 with the gate crank 304. During such pivoting of the gate 297 the arcuate portion 302 is moved downward past the orange in the chute and immediately adjacent the gate until the orange rolls into the trough 300 of the gate and engages the floor member 299, which at this time, projects substantially vertically. All of the oranges in the chute move down with the first orange but are prevented from rolling from the chute by the floor member 299. Upon raising the crosshead 38 after a juice extracting operation the arm 306 is also raised to release the crank 304. If the weight of oranges against the floor member 299 does not turn the gate as the abutment 312 is raised out of engagement with the crank 304, such turning of the gate will be accomplished by the abutment 314 upon its engagement with the crank. As the gate swings in a clockwise direction from the FIG. 16 position to the FIG. 14 position, the orange resting in the trough 300 against the floor member 299 is released and rolls from the gate and out of the chute 270 into the lower cup 30. The action of the arcuate gate portion 302 in following close behind the first orange as it is moved by the gate to be discharged from the chute, positively retains all other oranges in the chute, thus assuring that only one orange is fed at a time to the fruit receiving cup 30 by the gate.

Both the improved fruit feeder and the novel mounting arrangement of the juice contacting parts which need frequent servicing contribute to the successful operation of the machine of the present invention.

While a particular embodiment of the present invention has been shown and described, it will be understood that the fruit processing apparatus of the present invention is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. In a fruit processing apparatus, a fruit receiving cup, and a mounting assembly therefor comprising a carrier member, said fruit receiving cup being fixed on said carrier member, a spline on said carrier member, said spline having an inclined surface at one end, a mounting member for said carrier member, cooperating projections on said mounting member providing a guideway for said spline to support the carrier member for movement in a predetermined direction, an adjustable stop on said mounting member adjacent said guideway for limiting movement of said carrier member in said direction, an inclined surface on said stop, said carrier member being receivable in said mounting member with said spline in said guideway to restrain said carirer member against movement in a direction perpendicular to said predetermined direction, a shaft journalled on said carrier member, a lobe fixed on said shaft, a lug on said mounting member adjacent said lobe and engageable thereby when said inclined surfaces of said spline and of said stop are in engagement whereby upon turning of said shaft said lobe is brought into binding engagement with said lug to fixedly dispose said carrier member in predetermined relation with respect to said mounting member, the interengagement of the inclined surfaces on said spline and on said stop, and the interengagement of said lobe and lug being effective to press said spline against the cooperating projections on said mounting member.

2. In a fruit processing apparatus, a frame, fruit engaging means mounted for longitudinally reciprocatory movement in said frame, fruit receiving means having a juice conducting opening, means for removably mounting said fruit receiving means in said frame for movement transversely of said fruit engaging means and into aligned and assembled relation with the same, means firmly securing said fruit receiving means in axially aligned relation with said fruit engaging means after assembly therewith, juice accumulator means removably connected with said fruit receiving means and in alignment therewith, guide means on said frame for axially locating said juice accumulator means while accommodating conjoint motion of said juice accumulator means and said fruit receiving means relative to said frame upon assembly of said fruit receiving means with the frame, juice conducting means connecting said opening in said fruit receiving means with said juice accumulator means, drive means on said frame for moving said fruit engaging means toward and away from said fruit receiving means, a plunger axially slidable in said juice conducting means, drive means on said frame for lifting said plunger as said fruit engaging means approaches said fruit receiving means, and means for longitudinally restraining said plunger on said plunger drive means while accommodating transverse motion of said plunger relative to said drive means to quickly connect said plunger thereto and quickly disconnect said plunger therefrom upon assembly and disassembly of said fruit receiving means with the frame.

3. In a fruit processing apparatus, a frame, a fruit engaging cup movably supported by said frame, a mounting member on said frame, a carrier member, a fruit receiving cup on said carrier member, an elongated spline on said carrier member, said spline having an inclined surface at one end, oppositely disposed projections within said mounting member providing a guideway for said spline, adjustable stop means on said mounting member adjacent said guideway, said stop means having an inclined surface at one end opposed to said inclined surface on said spline, said carrier member being movable in said mounting member with said spline freely slidable in said guideway to bring said inclined ends of said spline and said stop means into engagement, and a lock on said carrier member engageable with said mounting member for holding said carrier member with the inclined surface of said spline in positive engagement with the inclined surface of said stop means, said inclined surfaces being disposed so that their engagement presses said spline against said projections in said mounting member.

4. In a fruit processing apparatus, a frame, a fruit engaging cup movably supported by said frame, a mounting member on said frame, a carrier member, a fruit receiving cup on said carrier member, an elongate spline on said carrier member, said spline having an inclined surface at one end, oppositely disposed projections within said mounting member providing a guideway for said spline, adjustable stop means on said mounting member adjacent said guideway, said stop means having an inclined surface at one end opposed to said inclined surface on said spline, said carrier member being movable in said mounting member with said spline in said guideway to bring said inclined ends of said spline and said stop means into engagement, and lock means on the other end of said carrier member engageable with said mounting member for holding said carrier member with the inclined surface of said spline in positive engagement with the inclined surface of said stop means, said inclined surfaces being disposed so that their engagement presses the associated end portion of said spline against said projections in said mounting member, said lock means including cam means for pressing the other end of said spline against said projections in said mounting member.

References Cited in the file of this patent

UNITED STATES PATENTS

| | | |
|---|---|---|
| 2,609,268 | Nye | Sept. 2, 1952 |
| 2,641,122 | Cavagnaro et al. | June 9, 1953 |
| 2,649,730 | Hait | Aug. 25, 1953 |
| 2,667,118 | Nelson | Jan. 26, 1954 |
| 2,723,618 | Matthews | Nov. 15, 1955 |
| 2,780,988 | Belk et al. | Feb. 12, 1957 |
| 2,897,033 | Ford | July 28, 1959 |